United States Patent [19]

Kantner

[11] 4,113,924
[45] Sep. 12, 1978

[54] ZINC-HALOGEN COMPOUND ELECTROCHEMICAL CELL HAVING AN AUXILIARY ELECTRODE AND METHOD

[75] Inventor: Edward Kantner, E. Brunswick, N.J.

[73] Assignee: Exxon Research & Engineering Co., Linden, N.J.

[21] Appl. No.: 800,786

[22] Filed: May 26, 1977

[51] Int. Cl.² .......................................... H01M 10/44
[52] U.S. Cl. ...................................... 429/50; 429/58; 429/101; 429/199; 429/229; 429/59
[58] Field of Search ............................. 429/50, 57–60, 429/218, 229, 231, 199, 101

[56] References Cited

U.S. PATENT DOCUMENTS

| 3,096,215 | 7/1963 | Voss et al. | 429/59 |
|---|---|---|---|
| 3,285,781 | 11/1966 | Zito, Jr. | 429/218 X |
| 3,328,202 | 6/1967 | Riffe | 429/199 |
| 3,382,102 | 5/1968 | Zito, Jr. | 429/218 X |
| 3,806,368 | 4/1974 | Marila et al. | 429/199 X |
| 3,816,177 | 6/1974 | Walsh | 429/229 X |
| 3,940,283 | 2/1976 | Symons | 429/229 X |
| 3,984,749 | 10/1976 | Müller | 429/50 X |

*Primary Examiner*—Charles F. LeFevour
*Attorney, Agent, or Firm*—Kenneth P. Glynn

[57] ABSTRACT

An electrochemical cell is described which contains, in a sealed configuration, an anode having a zinc anode-active material, a cathode having a halogen compound cathode-active material, a liquid electrolyte having a gas space above it, and an auxiliary electrode. The auxiliary electrode is made of a carbon-containing hydrophobic material, is adapted to carry a cathodic potential, and is positioned in the cell so as to be partially located in the liquid electrolyte and partially located in the gas space. A method of retarding pressure build-up in the cell also is described. The method involves converting hydrogen gas which is generated in the cell and builds up in the gas space to its ionic state via the formation of an ionic compound and dissolving the compound in the liquid electrolyte by creating a cathodic potential at the auxiliary electrode.

18 Claims, 4 Drawing Figures

ZINC-HALOGEN COMPOUND ELECTROCHEMICAL CELL HAVING AN AUXILIARY ELECTRODE AND METHOD

BACKGROUND OF THE INVENTION

The present invention is directed to sealed zinc/halogen compound electrochemical cells, and more particularly to these cells containing auxiliary electrodes which function to retard pressure build-up. The present invention is also directed to the method of retarding pressure build-up in these cells by the use of auxiliary electrodes.

Sealed electrochemical cells are of considerable importance as an efficient and durable source of energy. Due in part to their self-containment, they often have long shelf life, high energy efficiency and reasonable charge and discharge rates. Since the cells are sealed, little or no maintenance is required and this is perhaps critical in many applications. Among the many types of sealed cells which have various combinations of the foregoing advantages are the alkaline batteries, e.g., nickel-cadmium cells and lead-acid batteries. Heretofore, the zinc-halogen compound batteries, e.g., the zinc-$Cl_2$ and zinc-$Br_2$ batteries, which were used in a sealed configuration required venting and maintenance, and could not, therefore, be used in a totally sealed, maintenance-free configuration.

While many types of sealed cells have significant commercial possibilities, they often incurred a common problem. Specifically, one type of gas or another was generated and built up inside the cell during operation. This gas buildup could have resulted in rupture of the seal and/or diminished capabilities of the cell in terms of output. The problem has been dealt with in many ways including the use of venting devices, as well as the use of electrical devices and the use of chemical devices, each such solution being peculiar to the specific type of battery involved. Venting, which has been used with many different types of cells, including zinc-halogen cells, requires periodic maintenance to make up lost material. Venting $H_2$, e.g. in $H_2$ and $O_2$, may pose a safety hazard, depending on the particular situation, e.g., confined space. Not only would the cell be damaged if rupture occurred, but personnel and/or the surrounding environment could be harmed as well. For this reason, alternatives to venting have been sought and developed in the art.

For example, U.S. Pat. No. 3,305,404 (issued Feb. 21, 1967) describes the use of gas permeable membranes in lead-acid batteries, in conjunction with expensive platinum or palladium catalysts, to effect flameless combustion of hydrogen gas which would otherwise build up in the system. This approach is recommended where significant amounts of oxygen and lesser amounts of hydrogen are evolved in lead-acid systems. U.S. Pat. Nos. 3,410,725 (issued Nov. 12, 1968); 3,424,617 (issued Jan. 28, 1969); 3,598,653 (issued Aug. 10, 1971) and 3,817,717 (issued June 18, 1974) describe methods of removing hydrogen gas, e.g., by forming $H_2O$, from alkaline or lead acid cells by using electrodes having expensive catalysts such as platinum, palladium, silver or silver compounds. U.S. Pat. No. 3,117,033 (issued Jan. 7, 1964) describes using a hydrogen absorbing, silver compound, e.g., silver oxide, electrode for removal of hydrogen from alkaline storage batteries. U.S. Pat. No. 3,980,501 (issued Sept. 14, 1976) describes the use of hydrogen absorbing lanthanide cobalt or lanthanide nickel compound electrodes to remove gaseous hydrogen in alkaline batteries.

Of all the various techniques proposed in the prior art described, there is no recognition or suggestion of the technique used in the present invention to convert hydrogen gas in zinc-halogen compound cells and to permit a totally sealed configuration for such cells without the use of expensive catalytic devices.

SUMMARY OF THE INVENTION

The present invention is directed to a sealed electrochemical cell which includes a zinc-containing anode, a halogen compound-containing cathode, a liquid electrolyte having a gas space above it, and an auxiliary electrode. The auxiliary electrode is made of a carbon-containing hydrophobic material, is adapted to carry a cathodic potential, and is positioned in the cell so as to be partially located in the liquid electrolyte and partially located in the gas space.

The present invention is also directed to a method of retarding pressure build-up in sealed zinc-halogen compound cells. The method involves converting hydrogen gas, which is generated in the cell and builds up in the gas space, to its ionic state via the formation of an ionic compound, e.g., HCl or HBr, and dissolving it in the liquid electrolyte.

DETAILED DESCRIPTION OF THE INVENTION

Figure 1:
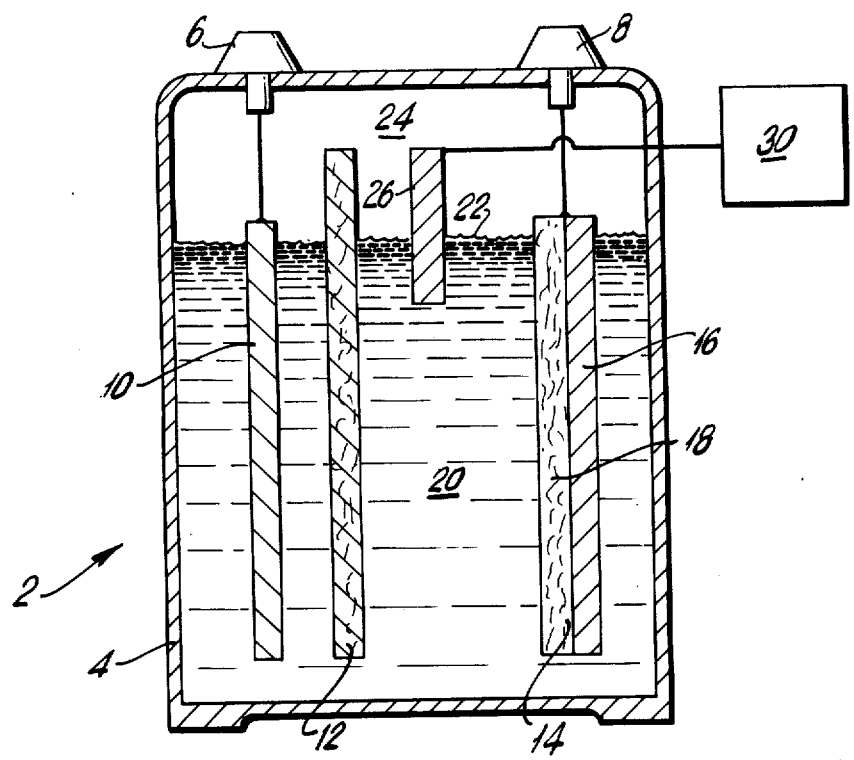
FIG. 1 shows an electrochemical cell of the present invention having an auxiliary electrode electrically connected to an independent power source.

The present invention encompasses a sealed electrochemical cell having as its principal components a zinc-containing anode, a halogen compound-containing cathode, a liquid electrolyte having a gas space above it, and an auxiliary electrode. The cell casing itself may be made of any of the known inert materials for fabricating such devices, including various plastics, composite materials and insulated metals. As with the materials of construction, the particular configuration, shape and design of the cell casing is of no importance to the present invention and the many choices would be readily apparent to the artisan. The same may be said of the sealing means and of the external connections or terminals of the cells of the present invention.

An important aspect of the cell of the present invention is the anode, made up of an anodic electrode and the anode-active material (in the charged state). The particular anodic electrodes which may be used in these cells are conductive surfaces upon which metallic zinc can be deposited during a charging process, said metallic zinc deposit forming the anode-active material. These anodic electrodes may be made of metal, carbon, or any electronically conductive composites which are chemically compatible with the other cell components and stable in the cell environment.

In addition to the specified anode in the cell of the present invention, the type of cathode is important. As mentioned, the cathodes used in the cells of the present invention are halogen compound-containing cathodes. By this is meant cathodes having one or more chlorine compounds, bromine compounds, or chlorobromo-compounds as their cathode-active materials. By "chlorine compounds," "bromine compounds" and "chlorobromo-compounds" is meant, respectively, compounds containing one or more chlorine atoms, bromine atoms or mixtures thereof which will provide adequate ionic activity to enable the cell to function. Included are molecurlar chlorine, molecular bromine, halogen carrier compounds such as organic chlorine, organic bromine and organic chlorobromo-compounds, the hydrates, e.g., chlorine hydrate, and the so-called "bromine oils" which have recently been described in the literature for zinc-bromine compound cells. The cathodic electrode, as distinguished from the cathode-active material, is a porous structure. In the present invention, this electrode may be carbon or it may be any refractory, porous metal which functions to store the cathode-active material when the battery is in a charged state. Thus, any conventional structure, which is stable in these cells and will support the halogen cathode-active material, may be used as the electrode, e.g. porous refractory, carbon or graphite substrates or metallic grids, screens or arrays. These are described throughout the literature as exemplified by the disclosures of U.S. Pat. Nos. 3,408,232 (issued Oct. 29, 1968) and 3,806,368 (issued Apr. 23, 1974), both incorporated herein by reference.

It should be noted that the anodic electrode and cathodic electrode of the cell of the present invention need not be initially in contact with all of its active material to respectively form the anode and the cathode. In fact, in the fully discharged state, the electrolyte may contain all of the cathode-active or anode-active material or all of both, depending upon what imbalance may exist between the amounts of active materials present in and participating in the operation of the cells. Thus, the anode and cathode of the present invention are claimed as they exist in the charged state.

The electrolytes employed in the cells of the present invention are any of the known liquid electrolytes for zinc-halogen compound cells which tend to be acidic in nature and which contain or have the capability of producing hydrogen or hydrogen ions. Among these are zinc chloride and zinc bromide in aqueous solutions, with or without other salts such as zinc sulfate, zin acetate, zinc trifluoroacetate, zinc nitrate, zinc citrate and zinc tetrafluoroborate, and the like, as well as non-zinc salts such as sodium chloride, etc., and compatible mixtures of any of the foregoing. Organic salt systems as well as hybrid organic-aqueous systems, may also be used. The particular choice of electrolyte is not critical although it is important that the electrolyte be liquid and, inherent in the nature of the present invention, be an electrolyte which both functions so as to provide adequate ionic activity for the cell to work and in the context of the overall cells, contains or admits to the generation of hydrogen or hydrogen ions.

In the cell of the present invention, the electrolyte is, of course, contained within a totally sealed configuration, and has a gas space above it. Hydrogen gas is generated during the operation of the cell and without the auxiliary electrode, would accumulate in the gas space to create a pressure buildup. This hydrogen gas may be generated during charge, during charged storage, or during discharge of the cell, and, without the auxiliary electrode, could result in increased pressure to the point of rupturing the sealed device and in diminished capacity and effectiveness of the cell. While the mechanism by which hydrogen gas is generated is not completely understood and may vary for different types of electrolytes and for the charge and discharge cycles, one principal mechanism is believed to be represented by the following equation:

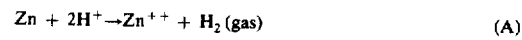

$$Zn + 2H^+ \rightarrow Zn^{++} + H_2 \text{(gas)} \qquad (A)$$

This reaction is believed to result from the acidic electrolyte acting on metallic zinc at the anode. However, regardless of the particular mechanism by which the hydrogen gas is generated within the cells of the present invention, it is a fact that hydrogen gas is generated and, without the auxiliary electrode of the present invention, accumulates to cause a pressure build-up in zinc-halogen compound electrochemical cells.

A critical feature of the cell of the present invention is, therefore, the auxiliary electrode. This auxiliary electrode is made of a carbon-containing hydrophobic material. For example, it may be made of an inert core such as a refractory material, e.g., a metal oxide, coated with carbon or graphite. Alternatively, it may be made of a mixture or composite of other material in combination with carbon or graphite, e.g., 50g Vulcan XC-72 (Cabot Corp.); 50g Pittsburgh Activated Carbon Type RB (Calgon Corp.); 10g Hercutuff 200 (Hercules Co.); 16.5g Fluon GP-1 PTFE Dispersion (ICI (U.S.) Inc.) The electrode may, of course, be made substantially of carbon or graphite alone. Among the preferred electrodes are the carbon electrodes having high surface area carbon, e.g., about 100 to 1500 m$^2$/g. An important feature of the auxiliary electrode used in the present invention is that it need not contain expensive platinum, palladium, silver or other catalytic material.

The auxiliary electrodes of the cells of the present invention must be adapted to carry a cathodic potential. This cathodic potential may be equal to or different from the potential of the halogen compound-containing cathode and may be achieved by being directly electrically connected to the cathode or by being electrically connected to an independent power source, as illustrated by the drawings, discussed below. Whatever cathodic potential is used, it should be recognized that it should be at an adequate level to produce the desired hydrogen conversion and thereby retard pressure buildup.

The auxiliary electrode of the cell of the present invention is positioned within the cell so as to be partially located in the liquid electrolyte and partially located in the gas space. The auxiliary electrode operated at the mentioned cathodic potential, converts the hydrogen gas back to its ionic state via the formation of ionic compounds and dissolves the hydrogen ions, e.g. as ionic compounds, in the liquid electrolyte. This is believed to be accomplished by the molecular hydrogen being consumed in the formation reaction of the ionic compound, at the solid-liquid-gas interface where the auxiliary electrode meets the liquid electrolyte-gas space interface. It is believed that the hydrogen gas from the gas space reacts at that site and the resulting hydrogen ion-containing ionic compounds migrate into the liquid electrolyte. For example, in a bromine cell the following reactions may occur at the auxiliary electrode:

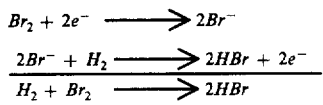

While the above equations are shown for a bromine cell, the corresponding equations would apply for a chlorine cell.

FIG. 1 illustrates an exemplary embodiment of the present invention having an auxiliary electrode electrically connected to an independent power source. The electrochemical cell is shown generally as 2 and has a sealed plastic casing 4. The casing has conventional terminals 6 and 8 for outside connection for charge and discharge of the cell. Anode 10 is the zinc plate and is shown schematically to be electrically connected to terminal 6. Separator 12 is shown to be placed between anode 10 and cathode 14, and is made of conventional battery separator material used in the conventional manner. Cathode 14 is made up of a conductive support material 16 with a porous carbon layer 18 containing molecular bromine when the battery is in the charged state. Cathode 14 is shown schematically to be electrically connected to terminal 8. Electrolyte 20 is shown having a liquid level 22. Above electrolyte 20 is gas space 24.

Auxiliary electrode 26 is shown partially submerged in electrolyte 20 and partially located in gas space 24. It is shown schematically to be electrically connected to outside independent power source 30. This outside power source is connected so as to create a cathodic potential at auxiliary electrode 26. This auxiliary electrode potential is created either periodically or continuously during the operation of cell 2, as desired, to retard pressure build-up therein and to convert hydrogen gas which is generated and to dissolve it in liquid electrolyte 20.

Figure 2:
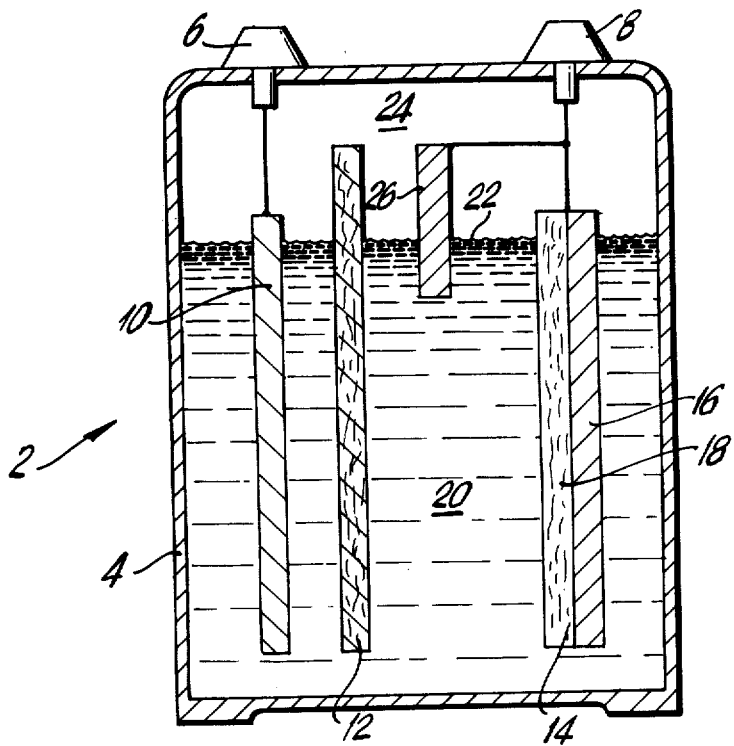
FIG. 2 shows an electrochemical cell of the present invention having an auxiliary electrode directly connected to the cathode of the cell.

FIG. 2 shows an electrochemical cell of the present invention having an auxiliary electrode directly connected to the cathode of the cell. All of the parts which are identical to those in FIG. 1 are identically numbered. As shown schematically in FIG. 2, auxiliary electrode 26 is electrically connected directly to cathode 14 and terminal 8. In this embodiment, the auxiliary electrode is operated at the same potential as the cathode and needs no outside independent power source.

The following examples are presented to further describe embodiments of the present invention. These examples are for illustrative purposes only, and the invention should not be construed to be limited thereto.

EXAMPLE 1

Figure 3:
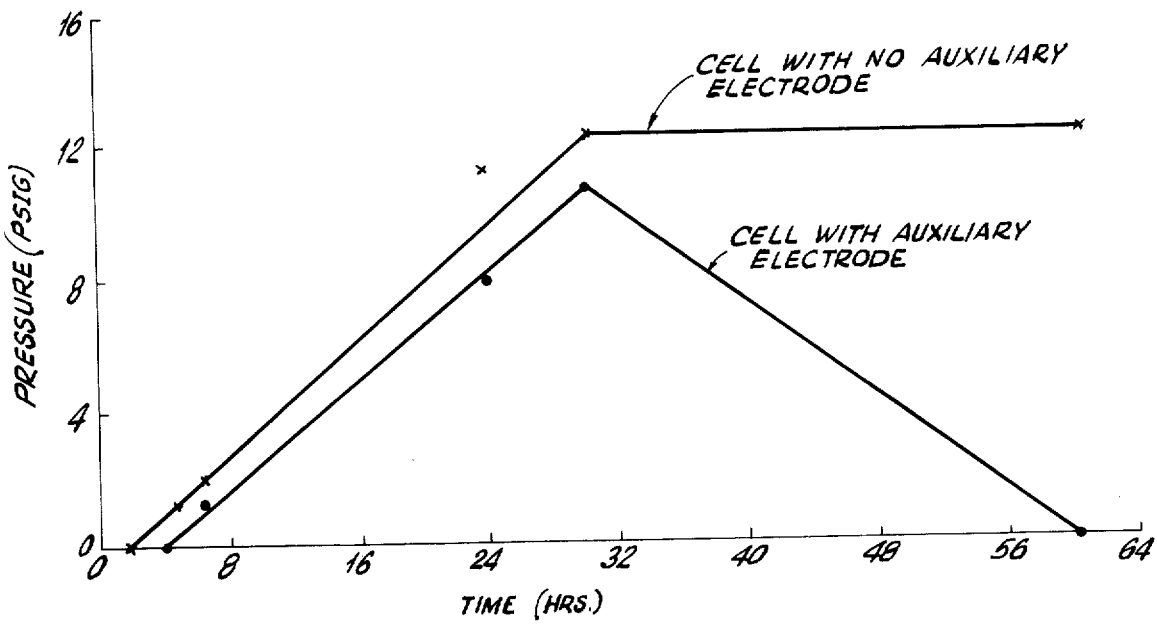
FIG. 3 illustrates graphically the effect of an auxiliary electrode of the present invention on internal cell pressure as a function of time.
Figure 4:
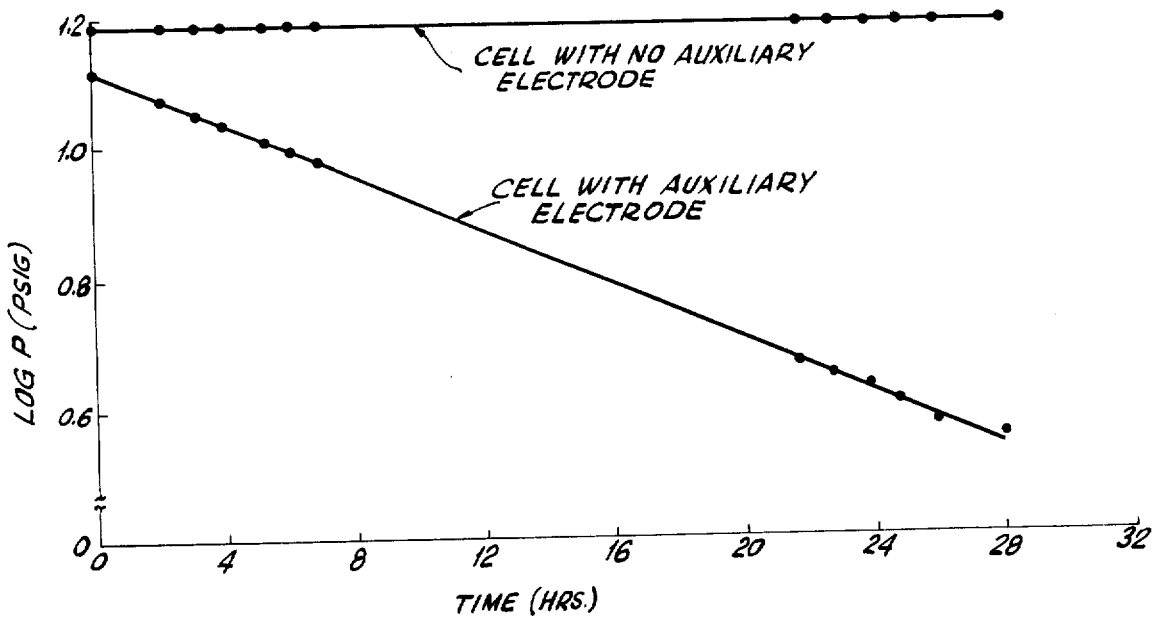
FIG. 4 illustrates graphically the pressure decay as a function of time of cells with and without an auxiliary electrode of the present invention.

FIGS. 3 and 4 illustrate the effect of the auxiliary electrode of the present invention, on the internal pressure of an operating zinc/bromine cell.

For this purpose, two cells were fabricated. The first one contained a planar, conductive carbon-plastic anode with a tantalum current collector. The cathode was a porous carbon structure affixed to a planar conductive electrode, identical to the one which was used as the anode. Both electrodes were 1½ × 2½ inches in size. A porous polyethylene sheet was interposed between the two electrodes and served as the separator. The electrolyte was a water solution of 3 M $ZnBr_2$, 1M methyl-ethyl-morpholinium bromide, and 0.2 M $ZnSO_4$. These cell components were contained in a gas-tight polypropylene cell case which was fitted with a pressure gauge to observe internal pressure changes during cell operation. The second cell was identical to the one described above, except that in addition to the cell components described above, it also contained an auxiliary electrode which was attached to the cathode, as depicted schematically in FIG. 2. The two cells were tested as follows: First the cells were charged at 240 ma for 4 hrs., rested in the charged condition for 24 hrs., discharged at 480 ma for approximately 1.5 hrs., and finally rested in the discharged condition for 30 hrs.

FIG. 3 shows the pressure buildup in the two cells, one with and one without the auxiliary electrode, during charge/discharge cycle. This is the ascending portion of the plot. On open circuit stand, following the discharge, the pressure in the cell with no auxiliary electrode remained unchanged, while the pressure in the cell with the auxiliary electrode decayed to zero, the condition which prevailed before the cell was operated. This charge/discharge cycling was repeated several times, and each time the pressure in the cell with the auxiliary electrode decayed to zero, while the other cell, with no auxiliary electrode, increased in pressure on each successive cycle, and periodic pressure venting was used to prevent possible cell rupture and injury to the experimenter.

FIG. 4 shows the pressure decay rate in a cell with the auxiliary electrode, compared to one where with no auxiliary electrode the pressure, under similar conditions, remains unchanged.

What is claimed is:

1. An electrochemical cell, comprising, in a sealed configuration:
   (a) an anode having a zinc anode-active material;
   (b) a cathode having a halogen compound cathode-active material;
   (c) an acidic liquid electrolyte and a gas space above the electrolyte, wherein hydrogen gas is capable of being generated in said cell and of accumulating in said gas space; and
   (d) an auxiliary electrode made of a carbon-containing hydrophobic material, and having a cathodic potential, said auxiliary electrode being positioned in said cell so as to be partially located in said liquid electrolyte and partially located in said gas space, and being capable of converting said hydrogen gas to its ionic state via the formation of an ionic compound whereby the ionic compound is dissolved in said liquid electrolyte.

2. The cell of claim 1 wherein said auxiliary electrode has said cathodic potential as a result of being electrically connected to a power source independent of power capable of being generated by said electrolyte, anode and cathode in said cell.

3. The cell of claim 2 wherein said auxiliary electrode contains high surface area carbon as its cathode-active material.

4. The cell of claim 3 wherein said cathode-active material is a bromine compound.

5. The cell of claim 3 wherein said cathode-active material is a chlorine compound.

6. The cell of claim 1 wherein said auxiliary electrode has said cathodic potential as a result of being electrically connected to said cathode of said cell.

7. The cell of claim 6 wherein said auxiliary electrode contains high surface area carbon as its cathode-active material.

8. The cell of claim 7 wherein said cathode-active material is a bromine compound.

9. The cell of claim 7 wherein said cathode-active material is a chlorine compound.

10. A method of retarding pressure buildup in an electrochemical cell having an anode with a zinc anode-active material, having a cathode with a halogen compound cathode-active material, and having an acidic liquid electrolyte with a gas space above said liquid electrolyte, wherein hydrogen gas is generated in said cell and accumulated in said gas space causing a pressure buildup, comprising:

creating a cathodic potential at an auxiliary electrode so as to convert said hydrogen gas to its ionic state via the formation of an ionic compound whereby the ionic compound is dissolved in said liquid electrolyte, said auxiliary electrode being made of a carbon-containing hydrophobic material and being positioned in said cell so as to be partially located in said liquid electrolyte and partially located in said gas space.

11. The method of claim 10 wherein said cathodic potential is created at said auxiliary electrode via the power from a power source independent of the power capable of being generated by said electrolyte, said anode, and said cathode in said cell.

12. The method of claim 11 wherein said auxiliary electrode contains high surface area carbon as its cathode-active material.

13. The method of claim 12 wherein said cathode-active material is a bromine compound.

14. The method of claim 12 wherein said cathode-active material is a chlorine compound.

15. The method of claim 10 wherein said cathodic potential is created at said auxiliary electrode via the power from said cathode of said cell.

16. The method of claim 15 wherein said auxiliary electrode contains high surface area carbon as its cathode-active material.

17. The method of claim 16 wherein said cathode-active material is a bromine compound.

18. The method of claim 16 wherein said cathode-active material is a chlorine compound.

* * * * *